(12) United States Patent
Merchant et al.

(10) Patent No.: US 12,739,449 B2
(45) Date of Patent: Sep. 15, 2026

(54) VIDEO SYSTEM WITH OBJECT REPLACEMENT AND INSERTION FEATURES

(71) Applicant: Roku, Inc., San Jose, CA (US)

(72) Inventors: Shashank C. Merchant, Sunnyvale, CA (US); Prateek Tandon, San Jose, CA (US); Michael Cutter, Golden, CO (US); Sunil Ramesh, Cupertino, CA (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/177,897

(22) Filed: Mar. 3, 2023

(65) Prior Publication Data

US 2024/0298045 A1 Sep. 5, 2024

(51) Int. Cl.
*H04N 21/234* (2011.01)
*H04N 21/25* (2011.01)
(Continued)

(52) U.S. Cl.
CPC . *H04N 21/23412* (2013.01); *H04N 21/23418* (2013.01); *H04N 21/251* (2013.01);
(Continued)

(58) Field of Classification Search
None
See application file for complete search history.

(56) References Cited

U.S. PATENT DOCUMENTS 8,910,201 B1 * 12/2014 Zamiska .............. H04N 21/458 725/60
10,613,726 B2 * 4/2020 Cohen .................. G06F 16/532
(Continued)

FOREIGN PATENT DOCUMENTS

JP 2003006671 A * 1/2003

OTHER PUBLICATIONS

Barron et al., "Shape, Albedo, and Illumination from a Single Image of an Unknown Object", Proceedings/CVPR, IEEE Computer Society conference on Computer Vision and Pattern Recognition, (Jun. 2012) http://www.researchgate.net/publication/228516983_Shape_Albedo_and_Illumination_from_a_Single_Image_of_an_Unknown_Object, retrieved Apr. 27, 2023.
(Continued)

*Primary Examiner* — Jason K Lin
(74) *Attorney, Agent, or Firm* — McDonnell Boehnen Hulbert & Berghoff LLP

(57) ABSTRACT

In one aspect, an example method includes (i) obtaining video that depicts an object across multiple frames of the video; (ii) detecting the object within the obtained video and determining object characteristic data associated with the detected object; (iii) determining user profile data associated with a viewer of the video; (iv) using at least the determined object characteristic data and the determined user profile data as a basis to select a replacement object from among a set of multiple candidate replacement objects; (v) replacing the detected object with the selected replacement object to generate video that is a modified version of the obtained video; and (vi) outputting for presentation the generated video.

20 Claims, 10 Drawing Sheets

(51) Int. Cl.
*H04N 21/258* (2011.01)
*H04N 21/2668* (2011.01)
*H04N 21/81* (2011.01)
*H04N 21/854* (2011.01)

(52) U.S. Cl.
CPC ... *H04N 21/25883* (2013.01); *H04N 21/2668* (2013.01); *H04N 21/8146* (2013.01); *H04N 21/854* (2013.01)

(56) References Cited

U.S. PATENT DOCUMENTS 12,240,445 B1 * 3/2025 Purdy ............... B60W 30/0956
2005/0225553 A1 * 10/2005 Chi ......................... G06T 7/215 345/474
2009/0210902 A1 * 8/2009 Slaney ............... H04N 21/4223 725/34
2013/0141530 A1 * 6/2013 Zavesky ................. G06T 19/20 348/43
2015/0310307 A1 * 10/2015 Gopalan ................ G06V 40/16 382/103
2019/0279681 A1 9/2019 Yuan
2020/0242367 A1 7/2020 Ludwigsen
2021/0120286 A1 * 4/2021 Govil ............. H04N 21/234318
2021/0304449 A1 9/2021 Mourkogiannis
2021/0329320 A1 10/2021 Triantafyllou
2022/0012520 A1 * 1/2022 Mok ....................... G10L 15/26
2022/0327320 A1 * 10/2022 Perincherry ........... G06V 20/64
2023/0262201 A1 * 8/2023 Gilad ................. H04N 21/4307 709/231
2024/0233443 A1 * 7/2024 Rush ...................... G06V 40/23

OTHER PUBLICATIONS

Great Learning Team, "Real-Time Object Detection Using TensorFlow", (Aug. 22, 2022) https://www.mygreatlearning.com;/blog/object-detection-using-tensorflow, retrieved Apr. 27, 2023.
Guo et al., "Neural 3D Scene Reconstruction with the Manhattan-world Assumption", arXiv:2205.02836v2 [cs.CV] May 18, 2022.
Mildenhall et al., "NeRF: Representing Scences as Neural Radiance Fields for View Synthesis", arXiv:2003.08934v2 [cs.CV] Aug. 3, 2020.
Lopez-Moreno et al., "Multiple Light source Estimation in a Single Image", Computer Graphics Forum, (Aug. 20, 2013) https://onlinelibrary.wiley.com/doi/abs/10.1111/cgf.12195, retrieved Apr. 27, 2023.
Elharrouss et al., "Image inpainting: A review" (Sep. 13, 2019).
Kán et al., "DeepLight: light source estimation for augmented realtiy using deep learning", The Visual Computer, 35:873-883 (May 7, 2019).

* cited by examiner

VIDEO SYSTEM WITH OBJECT REPLACEMENT AND INSERTION FEATURES

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) obtaining video that depicts an object across multiple frames of the video; (ii) detecting the object within the obtained video and determining object characteristic data associated with the detected object; (iii) determining user profile data associated with a viewer of the video; (iv) using at least the determined object characteristic data and the determined user profile data as a basis to select a replacement object from among a set of multiple candidate replacement objects; (v) replacing the detected object with the selected replacement object to generate video that is a modified version of the obtained video; and (vi) outputting for presentation the generated video.

In another aspect, an example computing system is disclosed. The computing system is configured for performing a set of acts that includes (i) obtaining video that depicts an object across multiple frames of the video; (ii) detecting the object within the obtained video and determining object characteristic data associated with the detected object; (iii) determining user profile data associated with a viewer of the video; (iv) using at least the determined object characteristic data and the determined user profile data as a basis to select a replacement object from among a set of multiple candidate replacement objects; (v) replacing the detected object with the selected replacement object to generate video that is a modified version of the obtained video; and (vi) outputting for presentation the generated video.

In another aspect, an example non-transitory computer-readable medium is disclosed. The computer-readable medium has stored thereon program instructions that upon execution by a computing system, cause performance of a set of acts that includes (i) obtaining video that depicts an object across multiple frames of the video; (ii) detecting the object within the obtained video and determining object characteristic data associated with the detected object; (iii) determining user profile data associated with a viewer of the video; (iv) using at least the determined object characteristic data and the determined user profile data as a basis to select a replacement object from among a set of multiple candidate replacement objects; (v) replacing the detected object with the selected replacement object to generate video that is a modified version of the obtained video; and (vi) outputting for presentation the generated video.

DETAILED DESCRIPTION

I. Overview

After a video is made, for a variety of reasons, it can be desirable to replace an underlying object in the video with a replacement object. In one example, this can help tailor the video to a given viewer's preferences or to provide targeted advertising to a viewer. As one simple example, in the case where a video depicts a Brand A soda can sitting on a desk, it may be desirable to replace the Brand A soda can with a Brand B soda can, based on the viewer preferring Brand B over Brand A.

Disclosed here are systems and methods that facilitate providing such functionality. In one aspect, this can involve a video system (i) obtaining video that depicts an object across multiple frames of the video; (ii) detecting the object within the obtained video and determining object characteristic data associated with the detected object; (iii) determining user profile data associated with a viewer of the video; (iv) using at least the determined object characteristic data and the determined user profile data as a basis to select a replacement object from among a set of multiple candidate replacement objects; (v) replacing the detected object with the selected replacement object to generate video that is a modified version of the obtained video; and (vi) outputting for presentation the generated video. These and related operations will now be described in greater detail.

For similar reasons, rather than replacing one object with another object, in some instances, it may be desirable to insert an object into a given area within a video. Also disclosed here are systems and methods that facilitate providing such functionality. In one aspect, this can involve a video system (i) obtaining video that depicts an area across multiple frames of the video, where the area is suitable for object insertion; (ii) detecting the area within the obtained video and determining area characteristic data associated with the detected area; (iii) determining user profile data associated with a viewer of the video; (iv) using at least the determined area characteristic data and the determined user profile data as a basis to select an object from among a set of multiple candidate objects; (v) inserting into the detected area the selected object to generate video that is a modified version of the obtained video; and (vi) outputting for presentation the generated video.

II. Example Architecture

A. Video System

Figure 1:
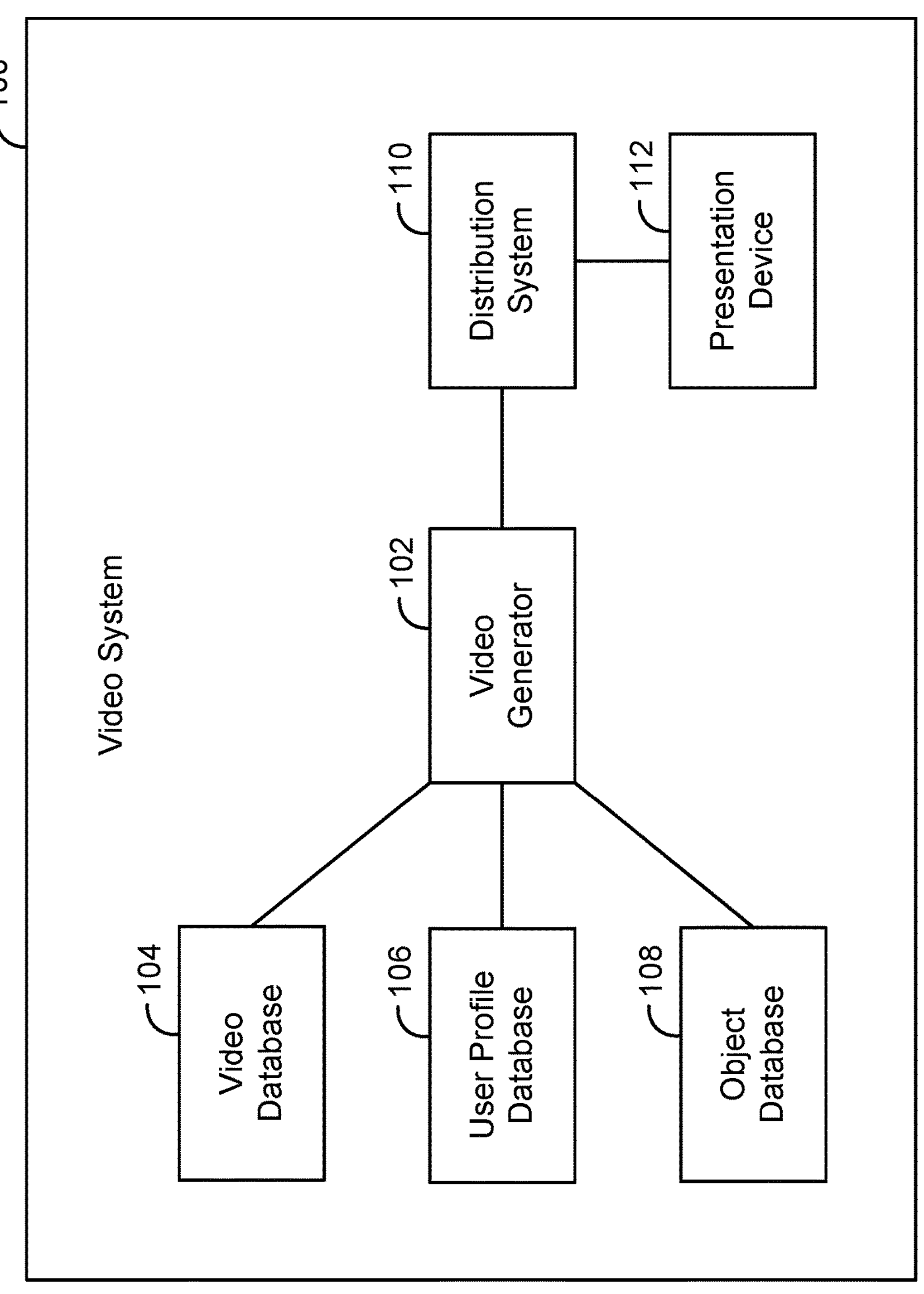
FIG. 1 is a simplified block diagram of an example video system in which various described principles can be implemented.

FIG. 1 is a simplified block diagram of an example video system 100. Generally, the video system 100 can perform operations related to video. There can be various types of video. For example, video can be or include a movie, a television show, or a commercial, or a portion or combination thereof, among numerous other possibilities.

Video can be made up of multiple frames and can be represented by video data, which can be generated, stored, and/or organized in various ways and according to various formats and/or protocols, using any related techniques now known or later discovered. For example, the video can be generated by using a camera and/or other equipment to capture or record a live-action event. In another example, video can be generated by rendering an animation to video. In yet another example, the video can be synthetically generated, such as by using one or more of the techniques described in this disclosure, or by using any related video generation techniques now known or later discovered.

As noted above, video data can also be stored and/or organized in various ways. For example, video data can be stored and organized as a Multimedia Database Management System (MDMS) and/or in various digital file formats, such as the MPEG-4 format, among numerous other possibilities.

The video data can represent the video by specifying various properties of the video, such as luminance, brightness, and/or chrominance values, and/or derivatives thereof. In some instances, the video data can be used to generate the represented video. But in other instances, the video data can be a fingerprint or signature of the video, which represents the video and/or certain characteristics of the video and which can be used for various purposes (e.g., to identify the video or characteristics thereof), but which is not sufficient at least on its own to generate the represented video.

In some instances, video can include an audio component and/or metadata associated with the video and/or audio. In the case where the video includes an audio component, the audio is generally intended to be presented in sync together with the video. To help facilitate this, the video can include metadata that associates portions of the video with corresponding portions of the audio. For example, the metadata can associate a given frame or frames of video with a corresponding portion of audio. In some cases, audio can be organized into one or more different channels or tracks, each of which can be selectively turned on or off, or otherwise controlled.

In some instances, video (with or without an audio component) can be made up of one or more segments. For example, in the case where the video is a movie, the video may be made up of multiple segments, each representing a scene of the movie. As another example, in the case where the video is a television show, the video may be made up of multiple segments, each representing a different act of the show. In other examples, a video segment can be a smaller or larger portion of the video. For instance, a video segment can be a portion of one scene, or a portion of one act. Or a video segment can be multiple scenes or multiple acts, or portions thereof.

Returning back to the video system 100, as noted above, the video system 100 can perform operations related to video. For example, the video system 100 can perform operations related to object replacement or object insertion within video. The video system 100 can include various components, such as a video generator 102, a video database 104, a user profile database 106, an object database 108, a distribution system 110, and a presentation device 112.

The video system 100 can also include one or more connection mechanisms that connect various components within the video system 100. For example, the video system 100 can include the connection mechanisms represented by lines connecting components of the video system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

In some instances, the video system 100 can include fewer or more components from that which has been described and/or the video system 100 can include multiple instances of at least some of the described components. The video system 100 and/or components thereof can take the form of a computing system, an example of which is described below.

B. Computing System

Figure 2:
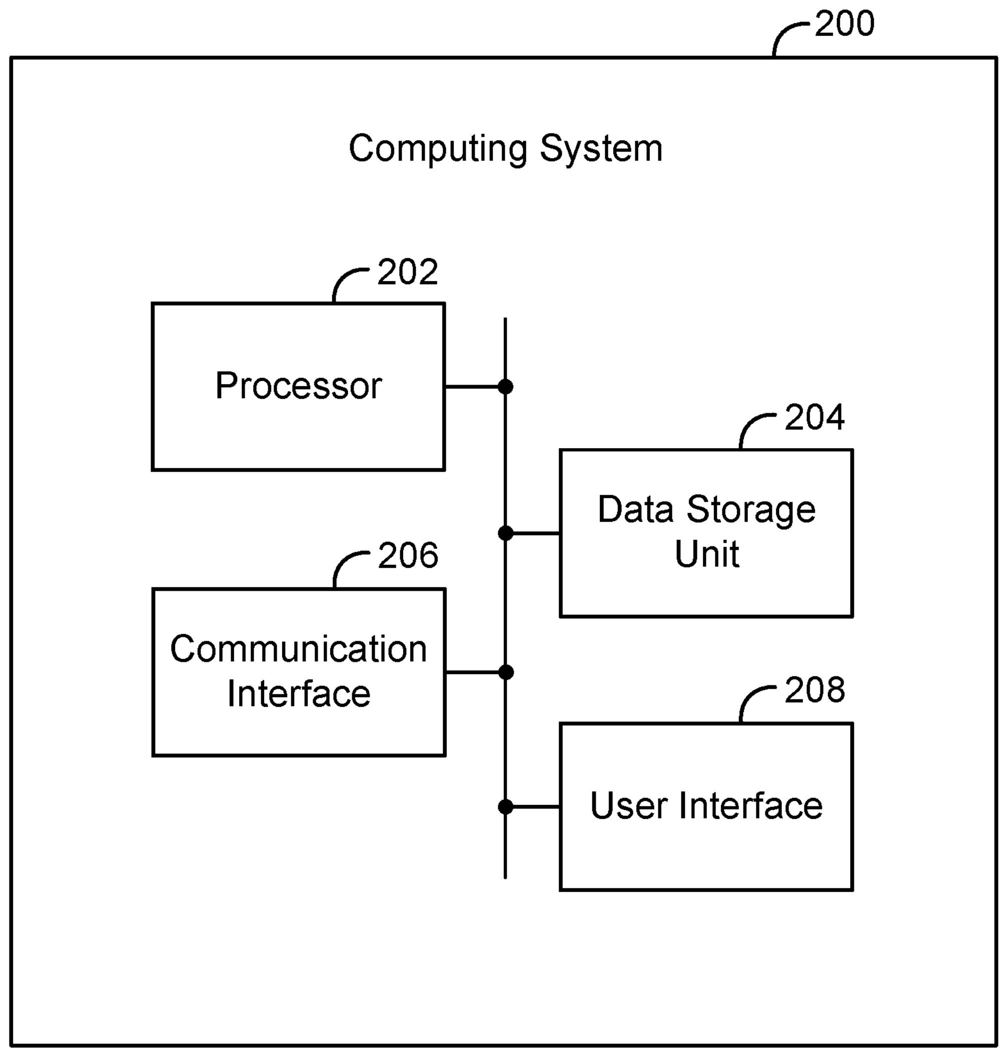
FIG. 2 is a simplified block diagram of an example computing system in which various described principles can be implemented.

FIG. 2 is a simplified block diagram of an example computing system 200. The computing system 200 can be configured to perform and/or can perform various operations, such as the operations described in this disclosure. The computing system 200 can include various components, such as a processor 202, a data storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data storage unit 204 as described below.

The data storage unit 204 can be or include one or more volatile, non-volatile, removable, and/or non-removable storage components, such as magnetic, optical, and/or flash storage, and/or can be integrated in whole or in part with the processor 202. Further, the data storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, such as a partially or fully cloud-based arrangement, for instance.

As noted above, the video system 100 and/or components of the video system 100 can take the form of a computing system, such as the computing system 200. In some cases, some or all of these entities can take the form of a more specific type of computing system, such as a desktop or workstation computer, a laptop, a tablet, a mobile phone, a television, a set-top box, and/or a streaming media device, among numerous other possibilities.

III. Example Operations

The video system 100, the computing system 200, and/or components of either can be configured to perform and/or can perform various operations. As noted above, the video system 100 can perform operations related to video. But the video system 100 can also perform other operations. Various example operations that the video system 100 can perform, and related features, will now be described with reference to select figures.

Among other things, the video system 100 can perform operations related to object replacement or object insertion within video.

A. Object Replacement

As noted above, the video system 100 can perform operations related to object replacement within video. In one aspect, this can involve the video system 100 (*i*) obtaining video that depicts an object across multiple frames of the video; (ii) detecting the object within the obtained video and determining object characteristic data associated with the detected object; (iii) determining user profile data associated with a viewer of the video; (iv) using at least the determined object characteristic data and the determined user profile data as a basis to select a replacement object from among a set of multiple candidate replacement objects; (v) replacing the detected object with the selected replacement object to generate video that is a modified version of the obtained video; and (vi) outputting for presentation the generated video. These and related operations will now be described in greater detail.

1. Obtain Video that Depicts an Object

To begin, the video generator 102 can obtain video that depicts an object across multiple frames of the video. In one example, this can involve the video generator 102 selecting video based on input received from a user via a user interface, and then obtaining the selected video. In another example, this can involve the video generator 102 automatically selecting video based on one or more predefined rules, and then obtaining the selected video. The video generator 102 can then obtain the selected video in various ways, such as by retrieving from a video database such as the video database 104, video data representing the selected video.

Figure 3:
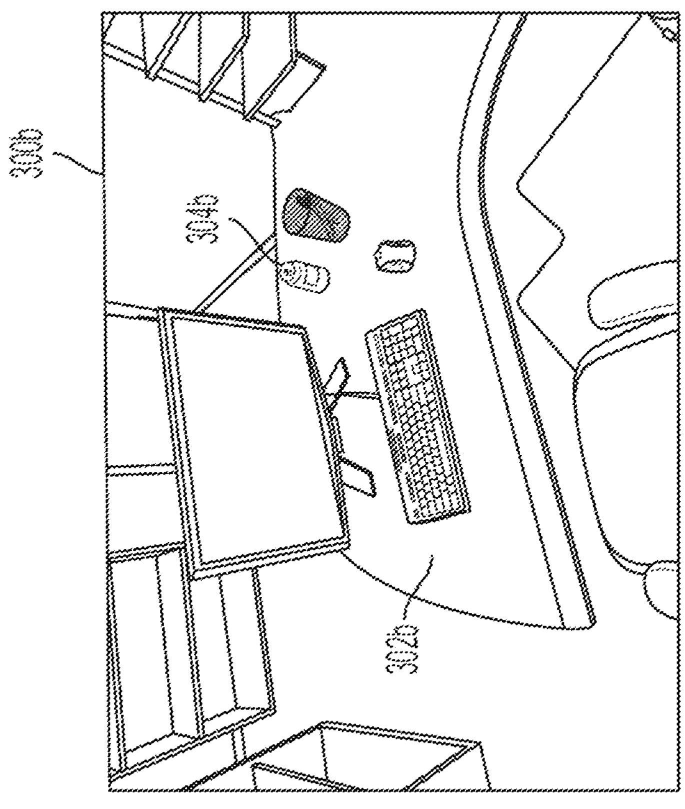
FIG. 3 is a depiction of frames of video content from a first example video.
Figure 3:
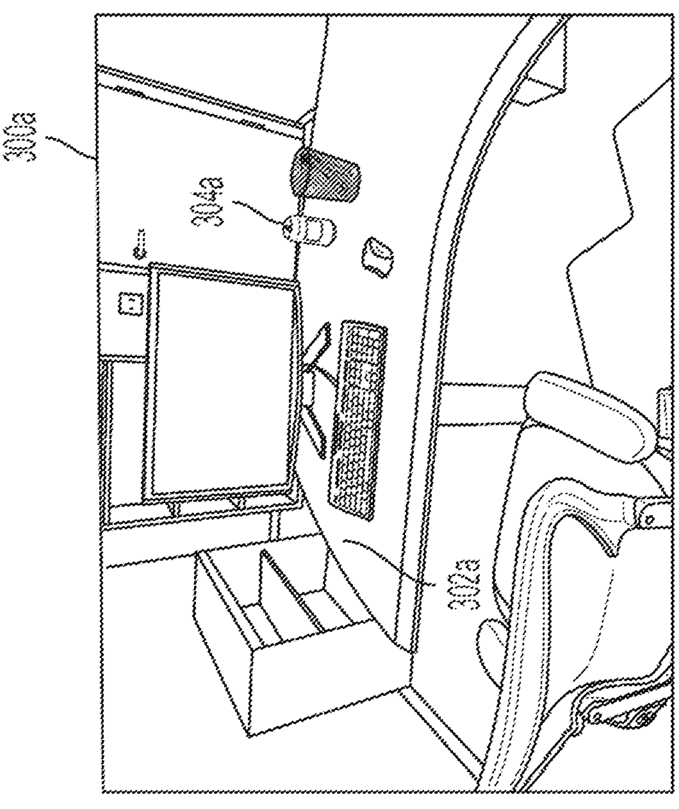

As noted above, the video can depict an object across multiple frames of the video. For example, the video can be a scene in a movie that depicts, among other things, an office desk with a soda can sitting on the desk, such that the soda can is depicted across multiple frames of the video. FIG. 3 depicts an example of two frames of the video, namely a first frame 300*a* and a second frame 300*b*. For illustration purposes, it can be assumed that the second frame 300*b* comes a few seconds after the first frame 300*a*. Each frame depicts a soda can sitting on a desk, where "Brand A" is printed on the can (represented in the figure as a square shape on the can). However, due to movement of the camera from the first frame 300*a* to the second frame 300*b*, the depiction of the desk and the soda can changes at least slightly from the first frame 300*a* as compared to the second frame 300*b*. As shown, in the first frame 300*a*, the desk and soda can are depicted in a first way (shown as the desk 302*a* and the soda can 304*a*), whereas and in the second frame 300*b*, the desk and soda can are depicted in a second way (shown as the desk 302*b* and the soda can 304*b*).

2. Detect the Object and Determine Object Characteristics Data

The video generator 102 can then detect the object within the obtained video and determine object characteristic data associated with the detected object.

There can be various types of object characteristic data. For example, the object characteristic data can indicate a size, shape, orientation, and/or scale of the detected object. This data can be represented in various ways, such as with one or more sets of pixel coordinates that define object edges, boundaries, wireframe models, orientation indicators, or the like, for one or more frames where the object is depicted. In this way, the object characteristic data can indicate a size, shape, orientation, and/or scale of the detected object in a time-based manner, across the multiple frames of the video where the object is depicted. As noted above, object characteristic data can take various forms and can include, for example, data that defines edges and boundaries of the object. As such, the act of detecting the object within the obtained video and determining object characteristic data can involve detecting edges and/or boundaries of the object.

Figure 4:
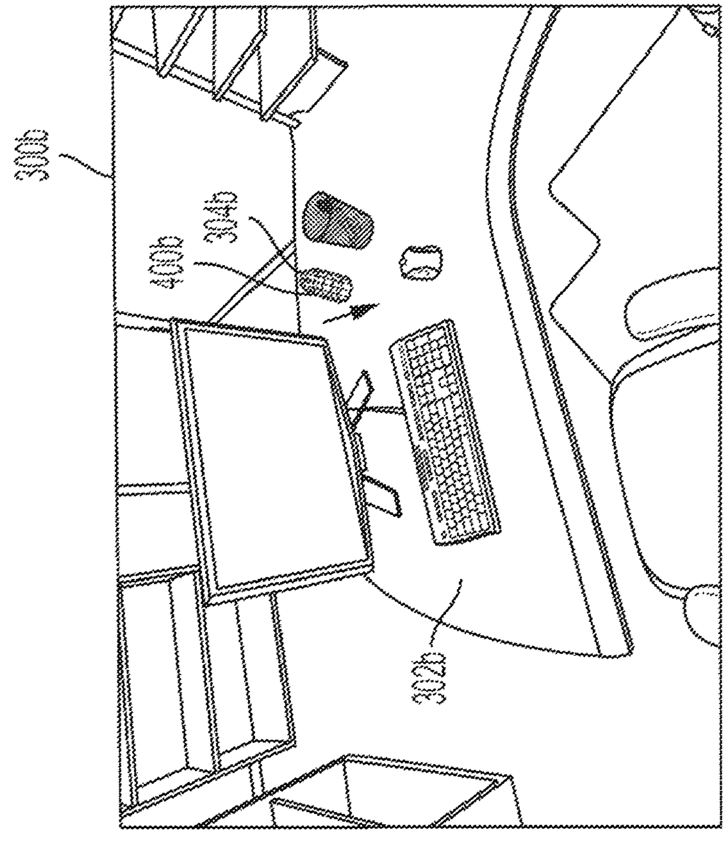
FIG. 4 is a depiction of the frames of video content of FIG. 3, with object characteristic data overlaid.
Figure 4:
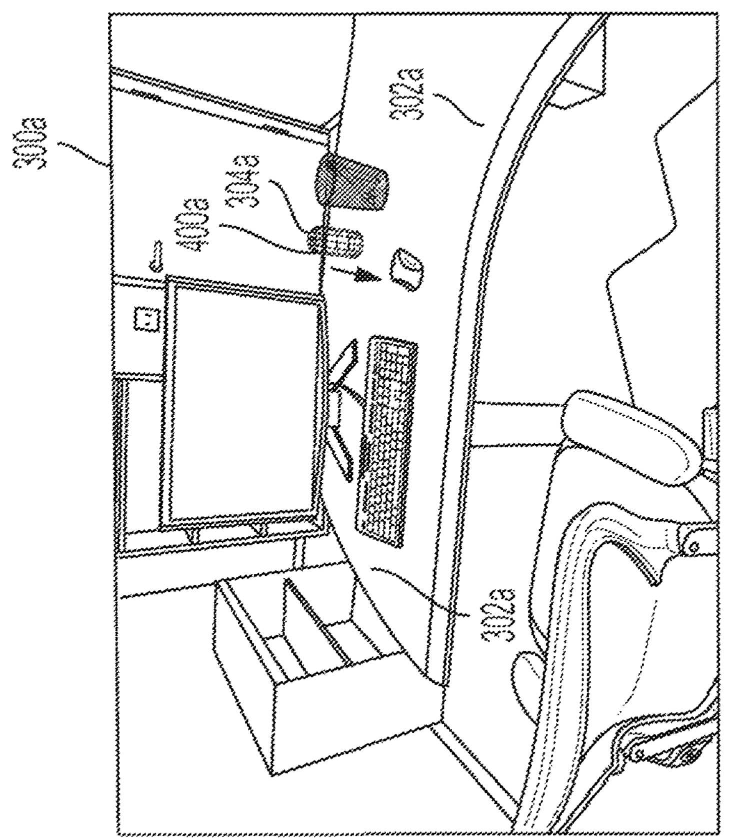

Returning to the example of the soda can sitting on the desk, the video generator 102 can detect the soda can and can determine object characteristic data for the soda can. FIG. 4 illustrates this and includes the same elements of FIG. 3, but with the addition of object characteristic data. As shown, with respect to the soda can 304*a* as shown in the first frame 300*a*, the object characteristic data 400*a* for the soda 304*a* can be represented with a corresponding wireframe model and a corresponding orientation arrow (indicating a direction of a front of the soda can 304*a*, relative to one or more references axes, etc.). Likewise, with respect to the soda can 304*b* as shown in the second frame 300*b*, the object characteristic data 400*b* for the soda can 304*b* can be represented with a corresponding wireframe model and a corresponding orientation arrow.

In some instances, the video generator 102 detecting the object within the obtained video can involve determining object position data that indicates where within the frame the object is depicted and/or when (i.e., temporally within the video) the object is depicted. In some cases, this can relate to the object characteristic data, as there can be some overlap between these two types of data. For instance, in the case where the object characteristic data is a wireframe model indicating the edges of the detected object, the object position data can specify where within a frame the wireframe model is positioned, thereby indicating a position of the detected object within the frame. To indicate when temporally within the video the object is depicted, the video generator 102 can refer to appropriate starting and ending time points and/or time offsets, for instance.

It should be noted that although certain examples of object characteristic data and object position data have been described, there are merely for illustration purposes and various other types of data could also be used to indicate the characteristic and/or position of a detected object across multiple frames of the video.

The video generator 102 can detect the object within the obtained video and determine object characteristic data associated with the detected object in various ways. In one example, the video generator 102 can do so by employing a machine learning technique, such as one that uses a deep neural network (DNN) to train a model to use a runtime input-data set that includes video data, to generate a runtime output-data set that includes object characteristic data and/or object position data. One example of a model that can be used for this purpose is the Object Detection model provided by TensorFlow. But other models can be used as well.

Notably though, before the video generator 102 uses a model to analyze a runtime input-data set to generate a runtime output-data set, the video generator 102 can first train the model by providing it with training input-data sets and training output-data sets. Each of the training input-data sets can include video data representing video depicting an object, and each of the training output-data sets can include object characteristic data and/or object position data of that object.

As such, in a first example set of training data, the training input-data can include video data representing video depicting a soda can sitting on a table, with the camera moving around the table to capture the soda can from different perspectives. And the training output data can include object characteristic data that is a time-based wireframe model and a time-based orientation indicator for the soda can. The training output data can also include object position data that is a time-based indication of the pixel coordinate corresponding to an anchor point of the wireframe model.

In a second example set of training data, the training input-data can include video data representing video depicting a soda can sitting on a kitchen counter, with the camera moving around the counter to capture the soda can from different perspectives. And the training output data can include object characteristic data that is a time-based wireframe model and a time-based orientation indicator for the soda can. The training output data can also include object position data that is a time-based indication of the pixel coordinate corresponding to an anchor point of the wireframe model.

In a third example set of training data, the training input-data can include video data representing video depicting a water bottle sitting on a table, with the camera moving around the table to capture the water bottle from different perspectives. And the training output data can include object characteristic data that is a time-based wireframe model and a time-based orientation indicator for the water bottle. The training output data can also include object position data that is a time-based indication of the pixel coordinate corresponding to an anchor point of the wireframe model.

Additional and/or alternative training data sets (for the same or different types of video, objects, object characteristic data, object position data, etc.) can be used to train or further train the model. In practice, it is likely that large amounts of training data-perhaps thousands of training data sets or more-would be used to train the model as this generally helps improve the usefulness of the model.

Training data can be generated in various ways, including by being manually assembled. However, in some cases, the one or more tools or techniques, including any training data gathering or organization techniques now known or later discovered, can be used to help automate or at least partially automate the process of assembling training data and/or training the model.

In some examples, the video generator 102 can use one or more synthetic data generation techniques to generate synthetic data, which can be used as at least part of the training data. This can be done in various ways. For example, the video generator 102 can render synthetic data using computer graphic engines and/or libraries such as the Unreal engine and library provided by Epic Games, or the Unity engine and library provided by Unity Technologies, among numerous possibilities.

The synthetic data can take various forms. For example, the synthetic data can also include video (or perhaps a given frame of video), where the video includes an object. The synthetic video can also include metadata, such as metadata that specifies various properties of the video, area, and/or object. For example, the metadata can specify each pixel's three-dimensional location, semantic class, albedo or other light-related properties, or any other property that can be determined (e.g., based on information derived from the graphics engine). Notably, by varying various configuration parameters (e.g., types and locations of objects in the scene, lighting sources, etc.), the video generator 102 can generate lots of difference instances of synthetic/training data covering many different examples of scenes with objects, etc.

After the model is trained, the video generator 102 can then provide to the model runtime input data, which the model can use to generate runtime output data. Generally, the runtime input data is of the same type as the training input data as described above.

As such, in a first runtime example, the runtime video data (which could be different from the video data used to train the model) can include video data representing video that is a scene in a movie that depicts, among other things, an office desk with a soda can sitting on the desk, such that the soda can is depicted across multiple frames of the video (as shown in FIG. 3). The model can then use this runtime input data to generate runtime output data, which can be of the same type as the output data as described above. As such, continuing with the first runtime example, the runtime output data can include object characteristic data and/or object position data for that soda can (as shown in FIG. 4).

Thus, more generally, responsive to the video generator 102 providing the video data to the trained model, the video generator 102 can receive from the trained model, corresponding generated object characteristic data and/or object position data.

It should be noted that in some cases, the specific types of training data and/or runtime data can include some or all of the different components described above, and perhaps other component as well. Also, the model, the training data, and the runtime data can be stored in and/or operate within, the video generator 102, for instance.

3. Determine User Profile Data

Next, the video generator 102 can determine user profile data associated with a viewer of the video. There can be various types of user profile data. For example, the user profile data can include demographic information, language preference information, or content viewing history information of the viewer, among numerous other possibilities. Indeed, various other types of user profile data can be used in this context as well. Such user profile data can be obtained, stored, organized, and retrieved in various ways, such as by using any related user profile data techniques now known or later discovered. In some instances, user profile data can be obtained, stored, and/or used after the client has provided explicit permission for such operations to be performed.

The video generator 102 can determine user profile data associated with a viewer of the video in various ways, such as by using a unique identifier associated with the viewer (e.g., a username that the viewer may use when logging into the an account used to view the video) as a basis to select and obtain corresponding user profile data from a user profile database, such as the user profile database 106.

4. Select Replacement Object

Next, the video generator 102 can use at least the determined object characteristic data and the determined user profile data as a basis to select a replacement object from among a set of multiple candidate replacement objects.

Candidate replacement objects can be stored in an object database, such as the object database 108. A given replacement object can be stored in the form of object data, which can include various data. For example, object data can include an object identifier, an object name, object characteristic data (e.g., a size, shape, orientation, and/or scale of the detected object), and/or other that represents the object (e.g., data in the form of a two-dimensional or three-dimensional model of the object).

As such, in one example, the video generator 102 can use at least the determined object characteristic data and the determined user profile data as a basis to select a replacement object from among a set of multiple candidate replacement objects, by using at least the determined object characteristic data and the determined user profile data to search for and select a replacement object from among a set of multiple candidate replacement objects stored in the object database 108.

In one example, this can involve the video generator 102 using mapping data to map at least the determined object characteristic data and the determined user profile data to a replacement object from among a set of multiple candidate replacement objects. This mapping data can be stored in the video generator 102 or the object database 108, for example.

As such, in one example, the determined object characteristic data can specify a wireframe model of a soda can, and the determined user profile data can specify a user preference of soda from Brand B (as opposed to Brand A). In another example, the determined object characteristic data can specify a wireframe model of a soda bottle, and again the determined user profile data can specify a user preference of soda from Brand B (as opposed to Brand A).

The mapping data can include additional mapping data sets (for the same or different types of object characteristic data, user profile data, etc. In some cases, the mapping data may include other types of data as well. For example, the mapping data can include scene attribute data specifying one or more details about a given scene (e.g., details about one or more other drinks in the scene, the types of people in the scene, etc.), as it may be desirable to have such scene attribute data also help drive the selection of a replacement object.

Scene attribute data can take other forms as well. For example, scene attribute data can include scene scale data. Generally, scene scale data specifies information related to the scale of the scene, such as by specifying the depth of one or more pixels of one or more objects or other elements of the scene.

The video generator 102 can determine scene scale data in various ways. In some examples, this can involve the video generator 102 using any monocular depth estimation technique now known or later discovered, to determine a depth of one or more pixels of a given portion (e.g., an object or area) of the scene. In some cases, the video generator 102 can also leverage information about the given portion to help with this determination. For example, in the case where the portion of the scene is an object, the video generator 102 can leverage the corresponding object data to help determine the depth of the object. Similarly, in the case where the portion of the scene is an area, the video generator 102 can leverage the corresponding object data for a nearby object to help determine the depth of the area. Additionally or alternatively, in the case where the portion of the scene is an area, the video generator 102 can leverage the corresponding area characteristic data to help determine the depth of the area.

In some cases, object data can indicate a size and/or shape of the object. The video generator 102 can then leverage this information as a basis to determine a scale of the object and/or other portions of the scene. For instance, in the case where a scene includes a speaker that is of a given brand and model, the video generator 102 can detect that the object is that specific brand and model of speaker (e.g., by accessing metadata of the video that specifies this or by using an object detection model to detect that specific brand and model based on the object's shape or other attributes) and can then use this information to look up size/scale information in a reference database, for example. The video generator 102 can then use that information as a reference point to determine the size and/or shape of other objects in the scene, to determine the scale of one or more objects in the scene and/or of the overall scene. In some instances, such as where a given object is known to be available in multiple sizes, the reference database can include size/scale information for each of those multiple sizes. And based on an analysis of multiple objects within the scene, the video generator 102 can determine which size/scale is most likely to be the correct one.

In some examples, the video generator 102 can use a trained model to help determine scene scale data. In this case, the video generator 102 can train the model by providing it with video data and corresponding metadata specifying information about areas and/or objects in the scene (e.g., metadata specifying a depth of each pixel of the object) as an input data set, such that the trained model can later be used to receive video data as input, and provide as output scene scale data that indicates a depth of the areas and/or objects (e.g., in the form of a depth of one or more pixels of the areas and/or objects).

In practice, it is likely that the mapping data will include large amounts of mapping data-perhaps thousands of mapping data sets or more. Mapping data can be generated in various ways, including by being manually assembled. However, in some cases, the one or more tools or techniques, including any data gathering or organization techniques now known or later discovered, can be used to help automate or at least partially automate the process of assembling mapping data.

Thus, more generally, with access to this mapping data, for given object characteristic data and user profile data (and potentially other data, such as scene attribute data), the video generator 102 can use the mapping data to map this data to a corresponding replacement object. For instance, for video depicting a soda can of Brand A and that has a given wireframe model, and where the viewer of the video prefers Brand B over Brand A, the video generator 102 can use the mapping data to select a replacement object that is a replacement soda can having the same or a similar wireframe (e.g., according to more or more predefined rules, similarly thresholds, etc.) to that of the underlying soda can and/or that is appropriate in view of the scale of the detected area or of the scene generally, and that is a soda can of Brand B, rather than Brand A.

In another example, for this same video depicting a soda can of Brand A and that has a given wireframe model, and where the viewer of the video prefers Brand B over Brand A, the video generator 102 can use the mapping data to select a replacement object that is a replacement soda bottle having the same or a similar wireframe to that of the underlying soda can, and that is a soda can of Brand B, rather than Brand A.

By selecting a replacement object in this way, the video generator 102 can select an appropriate replacement object to be used to replace the underlying object. Notably, in some instances, it may be desirable to apply a fuzzy logic algorithm or the like to help ensure that, even if the data being compared to the mapping data does not exactly match, the video generator 102 can detect near matches to allow the video generator 102 to still select a replacement object that is suitable for the intended use as a replacement object.

5. Replace Detected Object and Generate Video

Next, the video generator 102 can replace the detected object with the selected replacement object to generate video that is a modified version of the obtained video. The video generator can do this in various ways. In one example, this can involve the video generator 102 (*i*) obtaining a three-dimensional model of the selected replacement object; (ii) using the obtained three-dimensional model of the selected replacement object and the determined object characteristic data, together with a time-based (or other type of) affine transform model, to generate a time-based two-dimensional projection of the selected replacement object; (iii) determining object position data associated with the detected object; (iv) at a position indicated by the determined object position data, replacing the detected object with the corresponding time-based two-dimensional projection of the selected replacement object; and (v) applying a lighting estimation/normalization technique to blend the selected replacement object into the video. In this way, the video generator 102 can carry out the object replacement in a generally seamless way, preferably eliminating or at least reducing the chance of the viewer noticing the object replacement. This example technique will now be described in further detail.

To begin, the video generator 102 can obtain a three-dimensional model of the selected replacement object. In one example, this three-dimensional model can be stored in the object database 108 and as such, the video generator 102 can obtain the three-dimensional model by obtaining it from the object database 108. For example, in the context of the example soda can example described above, this could involve the video generator 102 obtaining a three-dimensional model of the replacement Brand B soda can.

In another example, such as where the object data for a given object represents the object in a limited number of views, one or more view synthesis techniques can be employed to create a three-dimensional representation suitable for object insertion. An example of such a technique is the Neural Radiance Fields or NeRF technique provided by Midenhall et all.

The video generator 102 can then use the obtained three-dimensional model and the determined object characteristic data, together with a time-based affine (or other type of) transform model, to generate a time-based two-dimensional projection of the selected replacement object. In this way, the video generator 102 can create a two-dimensional projection of the selected replacement object that corresponds to the two-dimensional projection of the underlying object, on a frame-by-frame basis.

Continuing with the soda can example described above, this could involve the video generator 102 generating a time-based two-dimensional projection of the replacement Brand B soda can that corresponds to the underlying Brand A soda can within the video, such that the Brand A soda can and the projection of the Brand B soda can generally have the same or a similar size, shape, orientation, etc. across the multiple frames where the Brand A soda can is depicted.

In generating the time-based two-dimensional projection of the selected object, the video generator 102 can additionally or alternatively generate this according to an appropriate scale based on the corresponding scene scale data (as discussed above). Thus, using the obtained three-dimensional model of the selected replacement object and the determined object characteristic data, together with a time-based transform model, to generate a time-based two-dimensional projection of the selected replacement object can involve using the obtained three-dimensional model of the selected object and the determined object characteristic data, together with a time-based transform model and scene scale data for the scene, to generate a scaled time-based two-dimensional projection of the selected replacement object.

The video generator 102 can then determine object position data associated with the detected object, such as by using any of the techniques described above (e.g., by using a suitably trained model). Then, at a position indicated by the determined object position data, the video generator 102 can replace the detected object with the corresponding time-based two-dimensional projection of the selected replacement object. Continuing with the soda can example described above, this could involve, at a position of the underlying Brand A soda can, the video generator 102 replacing the underlying Brand A soda can with the corresponding time-based two-dimensional projection of the replacement Brand B soda can.

After the replacement, the video generator 102 can then apply a lighting estimation/normalization technique to blend the selected replacement object into the video. Continuing with the soda can example described above, this can involve the video generator applying such a technique to blend the replacement Brand B soda can into the video. Among other things, this can help eliminate or at least reduce the chance of the viewer noticing the object replacement.

In some instances, the video generator 102 applying the lighting estimation/normalization technique can involve first determining lightning characteristic data associated with the scene and/or the selected replacement object and then considering the determined lightning characteristic data in connection with applying the lighting estimation/normalization technique, to help ensure a visually realistic insertion of the selected replacement object.

In one example, lightning characteristic data can include lightning characteristic data associated with the scene. For example, this could include light source data related to one or more light sources in the scene. Such light source data can include a given light source's location, light temperature, brightness level, etc. As another example, such lighting characteristic data can include shadow data related to one or more shadows in the scene. For example, in the case where a light source casts a shadow of the detected object, such shadow data can include that shadow's location, shape, size, etc.

In some examples, the lightning characteristic data can be specified on a frame-by-frame basis. As such, information about light sources, shadows, etc. could be specified on a frame-specific basis, with information changing as appropriate as the video progresses.

In another example, lightning characteristic data can include lightning characteristics of the selected replacement object. For instance, the lightning characteristic data could include information about the object's albedo or about the shape of the object (which can be used to determine the shape of a shadow of the object, based on a given light source in a given position).

Among other things, this determined lightning characteristic data can allow the video generator 102 to consider the determined lightning characteristic data, such that it can apply those characteristics to the replacement object. For instance, if the detected object has light emitted on it from a given light source, and that light casts a shadow, the video generator 102 can use that information to ensure that a replacement object has a similar type of light emitted on it, with a similar type of shadow (adjusted as needed based on the shape of the replacement object). Thus, in one example, the video generator 102 can determine a shape of a shadow of the replacement object (e.g., based on a given light source from the scene), and can then use that determined shape as a basis to modify the shadow of the detected object, such that the shape of the modified shadow corresponds with the replacement object.

In connection with this process, the video generator 102 can apply any lightning estimation/normalization techniques now know or later discovered. Examples of such techniques include those described in "DeepLight: light source estimation for augmented reality using deep learning" by Kan et al., "Multiple light source estimation in a single image" by Jorge Lopez-Moreno et al., and "Shape, Albedo, and Illumination from a Single Image of an Unknown Object" by Jonathan Barron et al.

Figure 5:
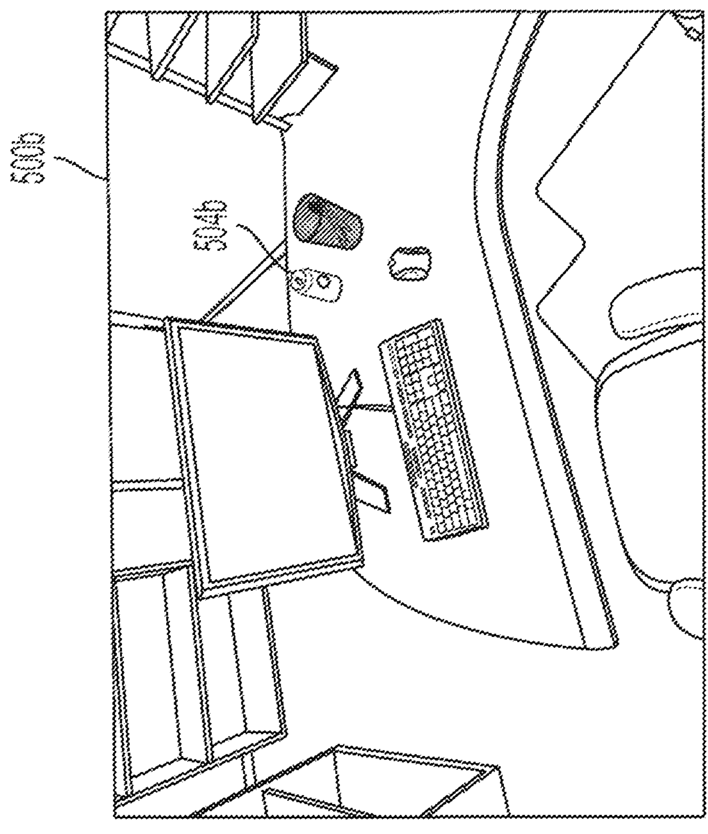
FIG. 5 is a depiction of the frames of video content of FIG. 3, after an object replacement operation.
Figure 5:
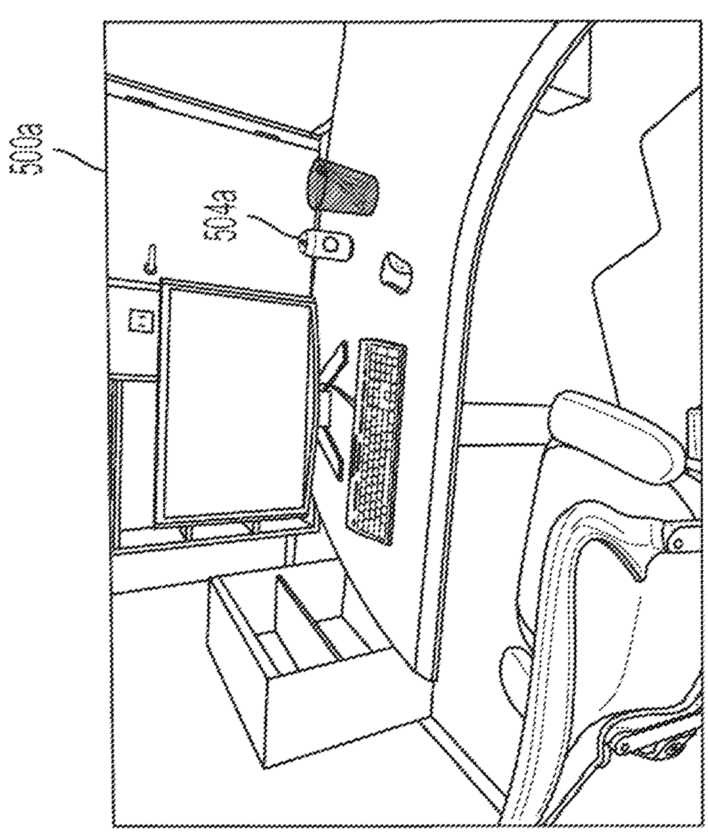

FIG. 5 illustrates the result of the example replacement operation described above, applied in connection with the video referenced by FIGS. 3 and 4. In particular, FIG. 5 depicts an example of two frames of the video, namely a first frame 500*a* and a second frame 500*b*, where in the video, the underlying Brand A soda can has been replaced by the replacement Brand B soda can (represented in the figure as a can with a circle shape on it). Notably, this replacement occurs across the frames, even as the depiction of the soda can changes based on the changing camera position. As such, in the first frame 500*a*, the first perspective of the underlying Brand A soda can has been replaced by the replacement Brand B soda can 504*a* from that same perspective (shown in FIG. 5 as the soda can 504*a*). Likewise, in the second frame 500*b*, the second perspective of the underlying Brand A soda can has been replaced by the replacement Brand B soda can 504*b* from that same perspective (shown in FIG. 5 as the soda can 504*b*).

It should be noted that the video generator 102 can replace a detected object with a selected replacement object to generate video that is a modified version of obtained video in other ways as well, such as by using any object replacement and/or video generation technique now known or later discovered.

6. Output the Generated Video

After the video generator 102 generates the video (with the replacement object), the video system 100 can output the generated video for presentation. In one example, this can include the distribution system 110 transmitting the generated video to the presentation device 112, which can receive and itself output for presentation the generated video, such that it can be viewed by a user.

The distribution system 110 can transmit video on one or more channels (sometimes referred to as stations or feeds). As such, the distribution system 110 can be associated with a single channel content distributor or a multi-channel content distributor such as a multi-channel video program distributor (MVPD).

The distribution system 110 and its means of transmission of video on the channel to the presentation device 112 can take various forms. By way of example, the distribution system 110 can be or include a cable-television head-end that is associated with a cable-television provider and that transmits the video on the channel to the presentation device 112 through hybrid fiber/coaxial cable connections. As another example, the distribution system 110 can be or include a satellite-television head-end that is associated with a satellite-television provider and that transmits the video on the channel to the presentation device 112 through a satellite transmission. As yet another example, the distribution system 110 can be or include a television-broadcast station that is associated with a television-broadcast provider and that transmits the content on the channel through a terrestrial over-the-air interface to the presentation device 112. And as yet another example, the distribution system 110 can be an Internet-based distribution system that transmits the video using a video streaming-characteristic service or the like to the presentation device 112.

In these and other examples, the distribution system 110 can transmit the content in the form of an analog or digital broadcast stream representing the video.

The presentation device 112 can receive video from one or more entities, such as the distribution system 110. In one example, the presentation device 112 can select (e.g., by tuning to) a channel from among multiple available channels, perhaps based on input received via a user interface, such that the presentation device 112 can receive video on the selected channel.

In some examples, the distribution system 110 can transmit video to the presentation device 112, which the presentation device 112 can receive. The presentation device 112 can also output video for presentation. As noted above, the presentation device 112 can take various forms. In one example, in the case where the presentation device 112 is a television (perhaps with an integrated set-top box and/or streaming media device), outputting the video for presentation can involve the television outputting the video via a user interface (e.g., a display device and/or a sound speaker), such that it can be presented to an end-user. As another example, in the case where the presentation device 112 is a set-top box or a streaming media device, outputting the video for presentation can involve the set-top box or the streaming media stick outputting the video via a communication interface (e.g., an HDMI interface), such that it can be received by a television and in turn output by the television for presentation to an end-user.

As such, in various scenarios, the distribution system 110 can transmit video to the presentation device 112, which can receive and output the video for presentation to an end-user.

7. Editing System

In some instances, the video generator 102 can include an editing system component that allows a user to review, approve, reject, and/or edit various operations or results of operations, as part of a quality assurance process. For instance, in the context of the video generator 102 determining object characteristic data and/or object position data of an object depicted in video, the editing system can playback the video with the determined object characteristic data and/or the determined object position data overlaid on it, and a user of the editing system can review and then approve or reject the object characteristic data and/or object position data. Additionally or alternatively, a user can use the editing system to adjust the object characteristic data and/or object position data, such as by adjusting various aspects of the wireframe model or the direction of the orientation arrow, for instance.

8. Other Examples and Use Cases

Although the techniques described herein have been discussed in the context of a few illustrative examples, it should be understood that the techniques can be applied in the context of many other examples.

For example, in the case where the underlying object is the Brand A soda can, rather than the replacement object being the Brand B soda can, the replacement object could instead be a Brand A soda can, but with Brand A being printed in a different language, and where that other language is selected based on the user's language preference or based on a language associated with a geographic location of the user. As another example, the replacement object could instead be a Brand C soda can, where Brand C is selected based on scene attribute data, such as data indicating that the scene takes place in a restaurant of Brand C. In another example, the replacement object could instead be a Brand D soda can, where Brand D is selected based on a viewing history of the user, such as a viewing history indicating that the user has a preference for content related to Brand D, for instance.

As yet another example, in the case where the underlying object is the Brand A soda can, rather than the replacement object also being a soda can, the replacement object could instead be soda bottle, a drinking glass, a coffee mug, or some other similar type of object, with the same or a similar size, shape, etc. And in other examples, the replacement object can be of a totally different type, but still of a similar size, shape, etc. For instance, where the underlying object a soda can, the replacement object can be a cylindrical pencil holder.

Notably, in instances, where the sizes and/or shapes of the detected object and the replacement object are different such that a portion of the detected object is not replaced by a corresponding portion of the replacement object, the video generator 102 can apply any inpainting or similar technique now known or later discovered, to complete the replacement (i.e., such that that portion of the detected object does now remain in the modified video content). Examples of such techniques are described in "Image inpaitning: A Review" by Elharrouss et al.

Continuing with the example context of objects on a desk, there can be many other types of objects that can be the underlying object and/or the replacement object. For example, the underlying object and/or the replacement object can be a laptop computer, a computer monitor, a keyboard, a mouse, a phone, and/or a book, among numerous other possibilities.

Notably though, the disclosed techniques can also be applied in connection with lots of others types of objects in lots of other contexts as well (i.e., beyond the context of objects on a desk). For instance, in another example, the obtained video could depict a person wearing an object such as sunglasses, and the video generator 102 could apply one or more of the techniques described above to replace the detected sunglasses with replacement sunglasses, thereby generating a modified version of the obtained video, in which the video depicts the replacement sunglasses instead of the detected sunglasses. These techniques could likewise be applied in connection with lots of other types of objects as well to perform all kinds of different object replacements. Indeed, the disclosed techniques can be applied in the context of any object that might be depicted in a movie, television show, or other video, and as such, this disclosure is not limited to the illustrative examples provided.

9. Example Methods

Figure 6:
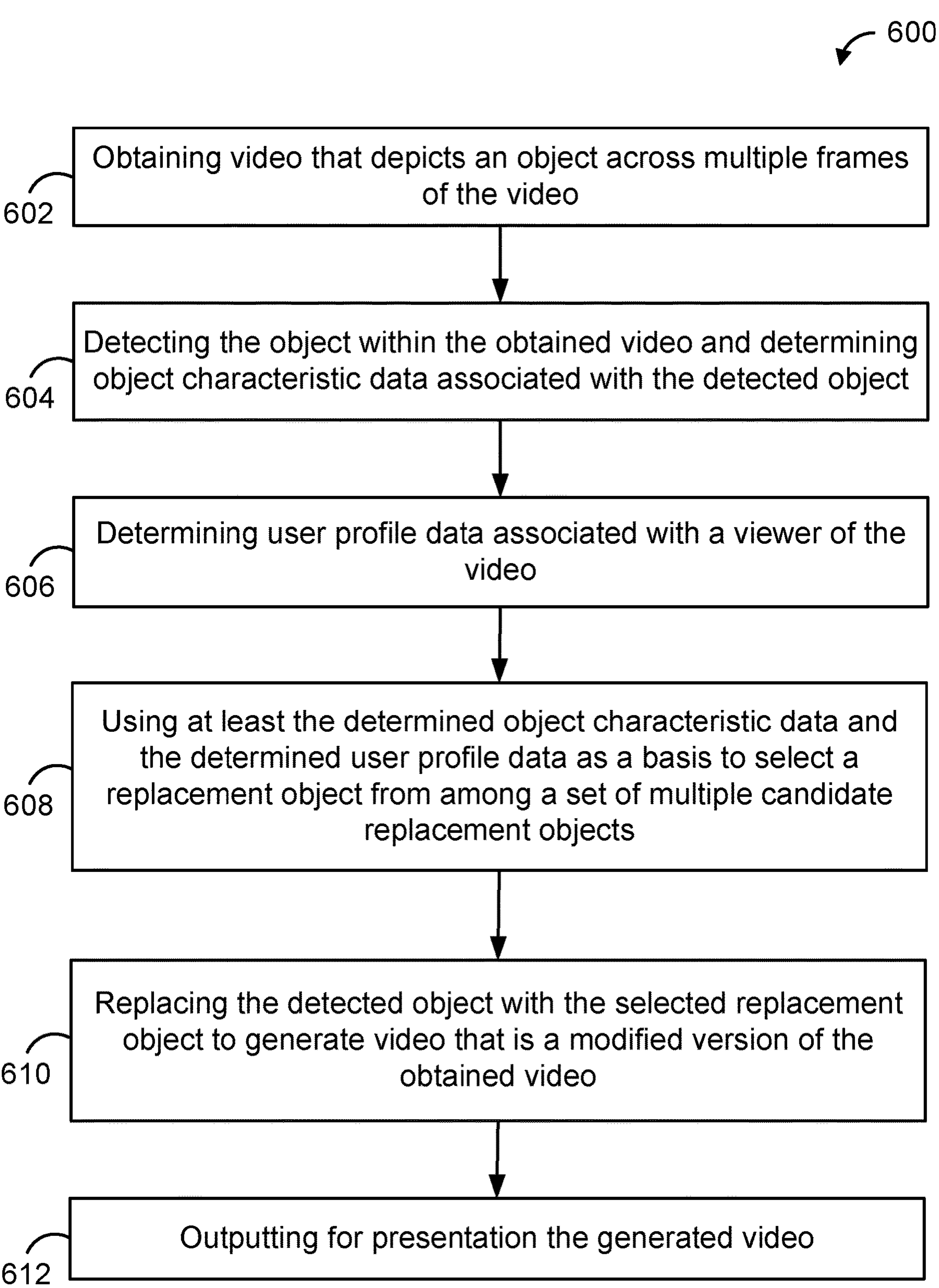
FIG. 6 is a flow chart of an example method.

FIG. 6 is a flow chart illustrating an example method 600. The method 600 can be carried out by a video system, such as the video system 100, or more generally, by a computing system, such as the computing system 200. At block 602, the method 600 includes obtaining video that depicts an object across multiple frames of the video. At block 604, the method 600 includes detecting the object within the obtained video and determining object characteristic data associated with the detected object. At block 606, the method 600 includes determining user profile data associated with a viewer of the video. At block 608, the method 600 includes using at least the determined object characteristic data and the determined user profile data as a basis to select a replacement object from among a set of multiple candidate replacement objects. At block 610, the method 600 includes replacing the detected object with the selected replacement object to generate video that is a modified version of the obtained video. At block 612, the method 600 includes outputting for presentation the generated video.

Figure 7:
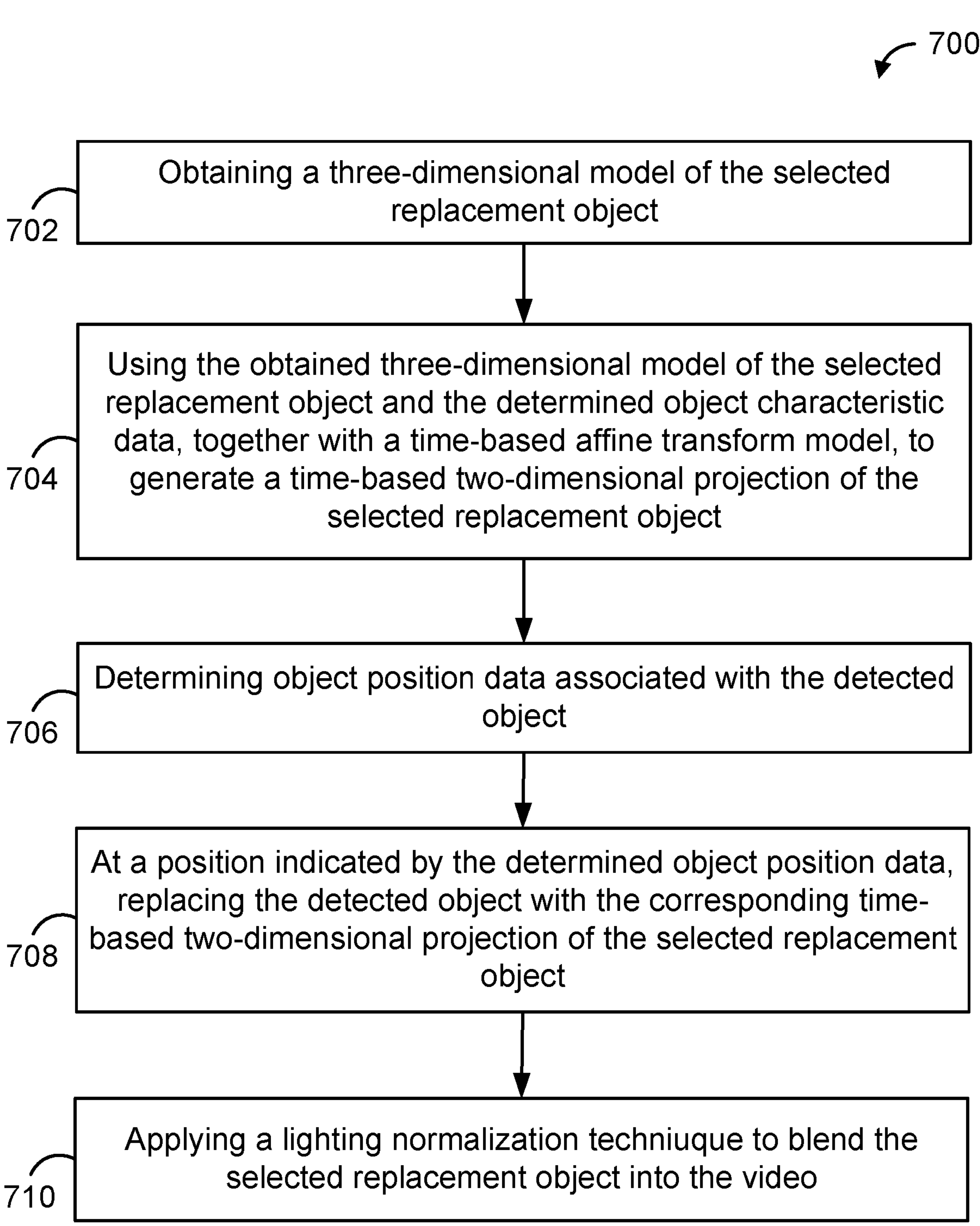
FIG. 7 is a flow chart of another example method.

FIG. 7 is a flow chart illustrating an example method 700. The method 700 can be carried out by a video system, such as the video system 100, or more generally, by a computing system, such as the computing system 200. At block 702, the method 700 includes obtaining a three-dimensional model of the selected replacement object. At block 704, the method 700 includes using the obtained three-dimensional model of the selected replacement object and the determined object characteristic data, together with a time-based affine transform model, to generate a time-based two-dimensional projection of the selected replacement object. At block 706, the method 700 includes determining object position data associated with the detected object. At block 708, the method 700 includes at a position indicated by the determined object position data, replacing the detected object with the corresponding time-based two-dimensional projection of the selected replacement object. At block 710, the method 700 includes applying a lighting normalization technique to blend the selected replacement object into the video.

B. Object Insertion

As noted above, the video system 100 can perform operations related to object insertion within video. In one aspect, this can involve the video system 100 (*i*) obtaining video that depicts an area across multiple frames of the video, where the area is suitable for object insertion; (ii) detecting the area within the obtained video and determining area characteristic data associated with the detected area; (iii) determining user profile data associated with a viewer of the video; (iv) using at least the determined area characteristic data and the determined user profile data as a basis to select an object from among a set of multiple candidate objects; (v) inserting into the detected area the selected object to generate video that is a modified version of the obtained video; and (vi) outputting for presentation the generated video. These and related operations will now be described in greater detail. In many instances, these operations are the same as or similar to those that are discussed above in connection with the objection replacement operations, and as such, many of the above described operations, variations, etc. are likewise applicable here. As such, the description below will focus on operations that are different and specific to object insertion.

1. Obtain Video that Depicts an Area

To begin, the video generator 102 can obtain video that depicts an area across multiple frames of the video, where the area is suitable for object insertion. In one example, such an area can be or include a flat or generally flat surface (e.g., a surface of a table or desk, a floor, etc.) on which an object can be placed. In some instances, the area may be limited to the portion of the surface where objects can be placed (e.g., specifically excluding portions of the surface that already include an object on the surface).

Figure 8:
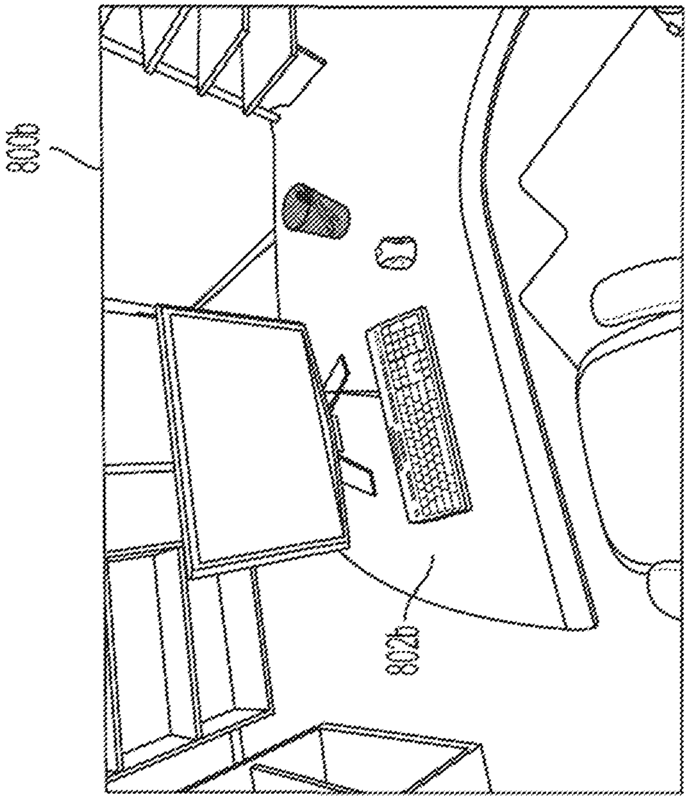
FIG. 8 is a depiction of frames of video content from a second example video.
Figure 8:
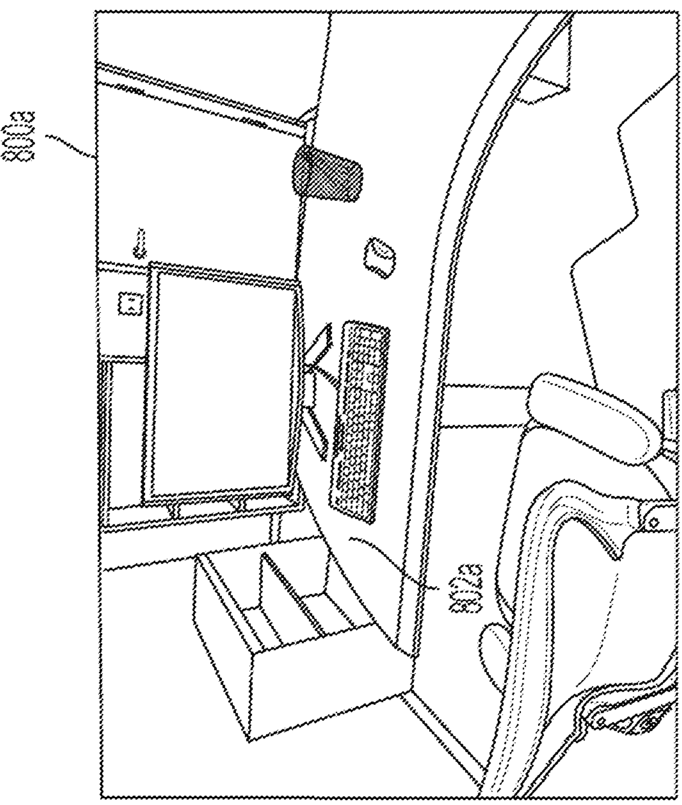

As noted above, the video can depict an area across multiple frames of the video. For example, the video can be a scene in a movie that depicts, among other things, an office desk surface, which can be considered an area suitable for object insertion. FIG. 8 depicts an example of two frames of the video, namely a first frame 800*a* and a second frame 800*b*. For illustration purposes, it can be assumed that the second frame 800*b* comes a few seconds after the first frame 800*a*. Each frame depicts a desk surface. However, due to movement of the camera from the first frame 800*a* to the second frame 800*b*, the depiction of the desk surface changes at least slightly from the first frame 800*a* as compared to the second frame 800*b*. As shown, in the first frame 800*a*, the desk surface is depicted in a first way (shown as the desk surface 802*a*), whereas and in the second frame 800*b*, the desk surface is depicted in a second way (shown as the desk surface 802*b*).

2. Detect the Area and Determine Area Characteristics Data

The video generator 102 can then detect the area within the obtained video and determine area characteristic data associated with the detected area. There can be various types of area characteristic data. For example, the area characteristic data can indicate a size and/or shape of the detected area. This data can be represented in various ways, such as with one or more sets of pixel coordinates that define area edges, boundaries, wireframe models, orientation indicators, or the like, for one or more frames where the area is depicted. In this way, the area characteristic data can indicate a size and/or shape of the detected area in a time-based manner, across the multiple frames of the video where the area is depicted.

Figure 9:
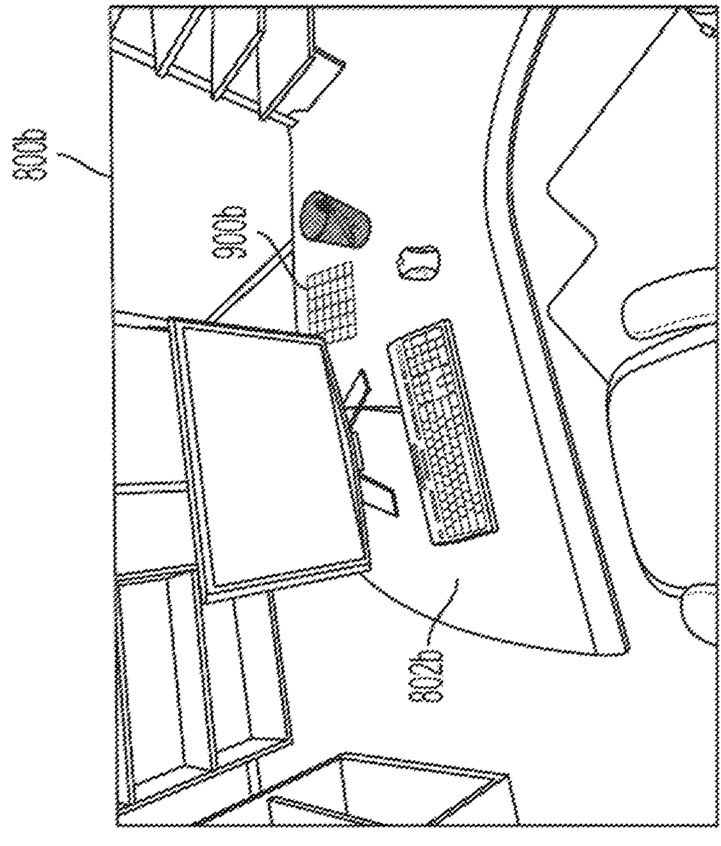
FIG. 9 is a depiction of the frames of video content of FIG. 8, with area characteristic data being overlaid.
Figure 9:
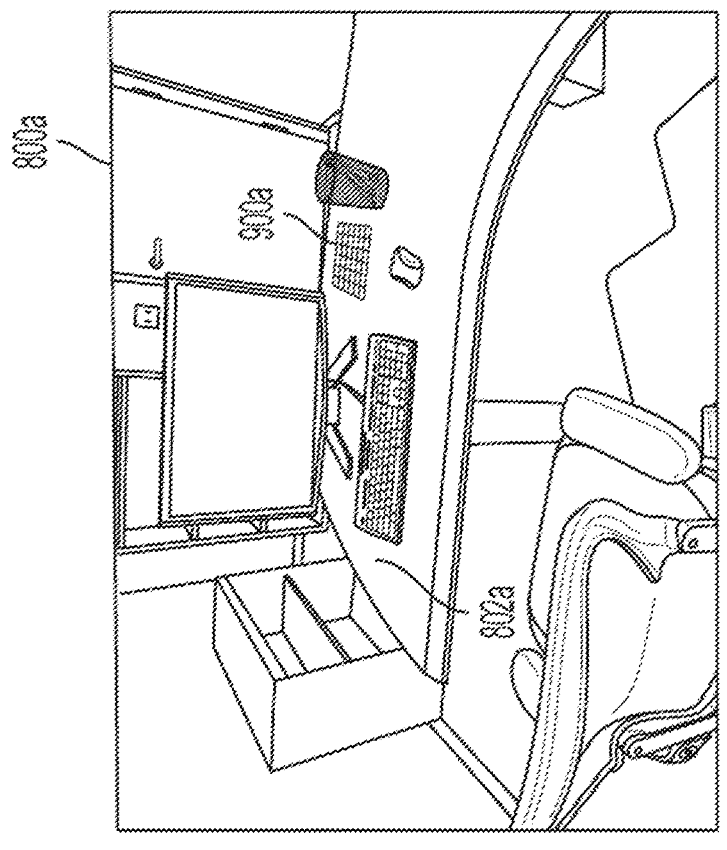

Returning to the example of the desk surface, the video generator 102 can detect the desk surface and can determine area characteristic data for the desk surface. FIG. 9 illustrates this and includes the same elements of FIG. 8, but with the addition of area characteristic data. With respect to the desk surface 802*a* as shown in the first frame 800*a*, the area characteristic data 900*a* for the desk surface 802*a* can be represented with a corresponding wireframe model and a corresponding orientation arrow (indicating a direction of a front of the area). Likewise, with respect to the desk surface 802*a* as shown in the second frame 800*b*, the area characteristic data 900*b* for the desk surface 802*b* can be represented with a corresponding wireframe model and a corresponding orientation arrow.

In some instances, the video generator 102 detecting the area within the obtained video can involve determining object position data that indicates where within the frame the area is depicted and/or when (i.e., temporally within the video) the area is depicted. In some cases, this can relate to the area characteristic data, as there can be some overlap between these two types of data. For instance, in the case where the area characteristic data is a wireframe model indicating the edges of the detected area, the area position data can specify where within a frame the wireframe model is positioned, thereby indicating a position of the detected object within the frame. To indicate when temporally within the video the area is depicted, the video generator 102 can refer to appropriate starting and ending time points and/or time offsets, for instance.

The video generator 102 can detect the area within the obtained video and determine area characteristic data associated with the detected area in various ways. In one example, the video generator 102 can do so by employing a machine learning technique, such as one that uses a DNN to train a model to use a runtime input-data set that includes video data, to generate a runtime output-data set that includes area characteristic data and/or area position data. Notably, the techniques described above in connection with the model for detecting an object can likewise be applied here, except that references to an object would be replaced with references to an area.

Thus, more generally, responsive to the video generator 102 providing video data to the trained model, the video generator 102 can receive from the trained model, corresponding generated area characteristic data. Examples of models that can be used for this purpose include any area/surface detection models and/or area/surface pose estimation models now known or later discovered.

3. Determine User Profile Data

Next, the video generator 102 can determine user profile data associated with a viewer of the video, such as by using any of the techniques described above.

4. Select Object

The video generator 102 can then use at least the determined area characteristic data and the determined user profile data as a basis to select an object from among a set of multiple candidate objects. The techniques described above in connection with selecting a replacement object can likewise be applied here, except that references to an object would be replaced with references to an area, and references to a replacement object would be replaced with references to an object.

5. Insert Object and Generate Video

Next, the video generator 102 can insert into the detected area the selected object to generate video that is a modified version of the obtained video.

The video generator can do this in various ways. In one example, this can involve the video generator 102 (*i*) obtaining a three-dimensional model of the selected object; (ii) using the obtained three-dimensional model of the selected object and the determined area characteristic data, together with a time-based affine transform model, to generate a time-based two-dimensional projection of the selected object; (iii) determining area position data associated with the detected area; (iv) at a position indicated by the determined area position data, inserting the corresponding time-based two-dimensional projection of the selected object; and (v) applying a lighting normalization technique to blend the selected object into the video. In this way, the video generator 102 can carry out the object insertion in a generally seamless way, preferably eliminating or at least reducing the chance of the viewer noticing the object insertion. This example technique will now be described in further detail.

To begin, the video generator 102 can obtain a three-dimensional model of the selected object. In one example, this three-dimensional model can be stored in the object database 108 and as such, the video generator 102 can obtain the three-dimensional model by obtaining it from the object database 108. For example, in the context of the example soda can example described above, this could involve the video generator 102 obtaining a three-dimensional model of the Brand B soda can, as referenced above in connection with the object replacement concept.

In another example, such as where the object data for a given object represents the object in a limited number of views, one or more view synthesis techniques can be employed to create a three-dimensional representation suitable for object insertion. An example of such a technique is the Neural Radiance Fields or NeRF technique provided by Midenhall et al.

The video generator 102 can then use the obtained three-dimensional model and the determined area characteristic data, together with a time-based affine (or other type of) transform model, to generate a time-based two-dimensional projection of the selected object. In this way, the video generator 102 can create a two-dimensional projection of the selected object that corresponds to the detected area, on a frame-by-frame basis.

In generating the time-based two-dimensional projection of the selected object, the video generator 102 can generate this according to an appropriate scale based on the corresponding scene scale data (as discussed above). In this way, the video generate 102 can insert into the scene, an object that is of the appropriate size. Thus, using the obtained three-dimensional model of the selected object and the determined area characteristic data, together with a time-based transform model, to generate a time-based two-dimensional projection of the selected object can involve using the obtained three-dimensional model of the selected object and the determined area characteristic data, together with a time-based transform model and scene scale data for the scene, to generate a scaled time-based two-dimensional projection of the selected object.

The video generator 102 can then determine area position data associated with the detected area, such as by using any of the techniques described above (e.g., by using a suitably trained model). Then, at a position indicated by the determined area position data, the video generator 102 can insert in the detected area the corresponding time-based two-dimensional projection of the selected object. Continuing with the soda can example described above, this could involve the video generator 102 generating a time-based two-dimensional projection of the Brand B soda can, where the bottom surface of the Brand B soda can aligns with the surface of the desk across multiple frames.

In this way, the video generator 102 can render the selected object in the detected area. In other words, with respect to the selected object, the video generator 102 can perform a three-dimensional transformation, such that the object is transformed into the scene's camera coordinate system. In some instances, this transformation can be derived by finding a known object (e.g., a planar object or a non-planar object) in the scene and solving the perspective-n-point problem to resolve the pose of this object. In this context, various techniques can be used to help reconstruct a scene, examples of which are described in "Neural 3D Scene Reconstruction with the Manhattan-world Assumption" by Guo et al.

In some instances, such as if the object is not planar, the video generator 102 can use monocular pose estimation to detect the area in which the object will be inserted into. Transformation through time can be tracked using various techniques such as sparse/dense optical flow-based techniques and/or other tracking techniques such as those that involve feature matching, template matching, deep-learning based matching, or the like. The video generator 102 can then apply one or more pose estimation techniques to determine the pose of the area and thus perform the object insertion operation.

After the insertion, the video generator 102 can then apply a lighting normalization technique to blend the selected object into the video. Continuing with the soda can example described above, this can involve the video generator 102 applying such a technique to blend the Brand B soda can into the video. Among other things, this can help eliminate or at least reduce the chance of the viewer noticing the object replacement.

In some instances, the video generator 102 applying the lighting estimation/normalization technique can involve first determining lightning characteristic data associated with the scene and/or the selected object and then considering the determined lightning characteristic data in connection with applying the lighting estimation/normalization technique, to help ensure a visually realistic insertion of the selected object.

In one example, lightning characteristic data can include lightning characteristic data associated with the scene. For example, this could include light source data related to one or more light sources in the scene. Such light source data can include a given light source's location, light temperature, brightness level, for instance.

In some examples, the lightning characteristic data can be specified on a frame-by-frame basis. As such, information about light sources, etc. could be specified on a frame-specific basis, with information changing as appropriate as the video progresses.

In another example, lightning characteristic data can include lightning characteristics of the selected object. For instance, the lightning characteristic data could include information about the object's albedo or about the shape of the object (which can be used to determine the shape of a shadow of the object, based on a given light source).

Among other things, this determined lightning characteristic data can allow the video generator 102 to consider the determined lightning characteristic data, such that it can apply those characteristics to the selected object.

In connection with this process, the video generator 102 can apply any lightning estimation/normalization techniques now know or later discovered. Examples of such techniques include those described in "DeepLight: light source estimation for augmented reality using deep learning" by Kan et al., "Multiple light source estimation in a single image" by Jorge Lopez-Moreno et al., and "Shape, Albedo, and Illumination from a Single Image of an Unknown Object" by Jonathan Barron et al.

Although FIG. 5 was described above in connection with the object replacement concept, FIG. 5 also illustrates the result of the example insertion operation described above, in connection with the video referenced by FIGS. 8 and 9. In particular, as noted above, FIG. 5 depicts an example of two frames of the video, namely a first frame 500*a* and a second frame 500*b*, where in the video, the Brand B soda can has been inserted. Notably, this insertion occurs across the frames, even as the depiction of the soda can changes based on the changing camera position. As such, in the first frame 500*a*, the Brand B soda can 504*a* has been inserted in a first perspective (shown in FIG. 5 as the soda can 504*a*). Likewise, in the second frame 500*b*, the Brand B soda can 504*b* has been inserted in a second perspective (shown in FIG. 5 as the soda can 504*b*).

It should be noted that the video generator 102 can insert a selected object to generate video that is a modified version of obtained video in other ways as well, such as by using any object insertion and/or video generation technique now known or later discovered.

6. Output the Generated Video

The video generator 102 can then output for presentation the generated video, such as by using any of the techniques described above.

7. Example Methods

Figure 10:
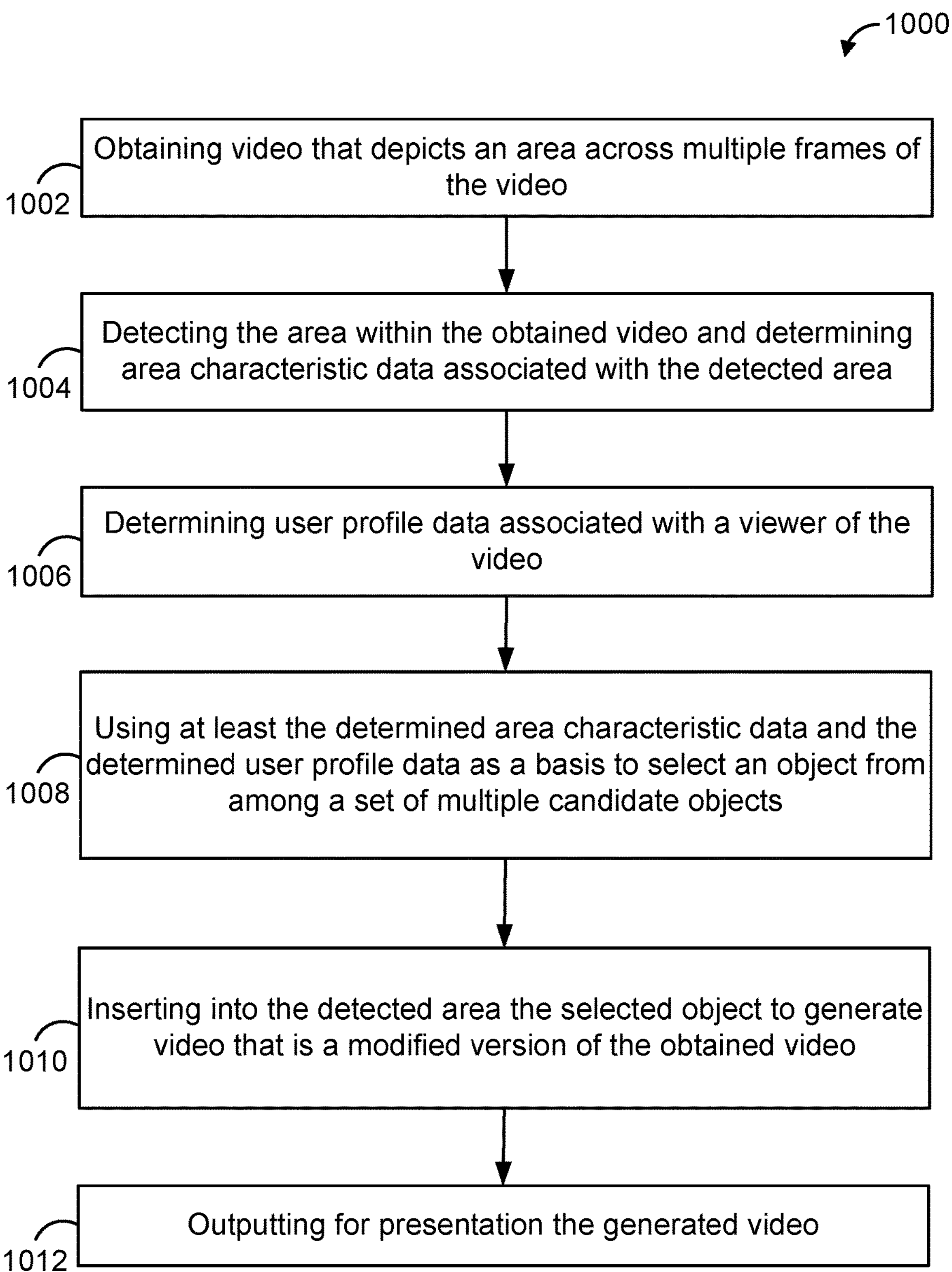
FIG. 10 is a flow chart of an example method.

FIG. 10 is a flow chart illustrating an example method 1000. The method 1000 can be carried out by a video system, such as the video system 100, or more generally, by a computing system, such as the computing system 200. At block 1002, the method 1000 includes obtaining video that depicts an area across multiple frames of the video. The area can be suitable for object insertion. At block 1004, the method 1100 includes detecting the area within the obtained video and determining area characteristic data associated with the detected area. At block 1006, the method 1000 includes determining user profile data associated with a viewer of the video. At block 1008, the method 1000 includes using at least the determined area characteristic data and the determined user profile data as a basis to select an object from among a set of multiple candidate objects. At block 1010, the method 1000 includes inserting into the detected area the selected object to generate video that is a modified version of the obtained video. At block 1012, the method 1000 includes outputting for presentation the generated video.

8. Other Examples and Use Cases

Generally, the examples and use cases discussed above in connection with object replacement are similarly applicable in the context of object insertion, except that instead of replacing an existing object, the selected object is inserted into the detected area. Among other things, such a technique can aid in the process of producing video by facilitating the insertion of objects into video, as desired by a producer or the like.

Although the techniques described herein have been discussed in the context of a few illustrative examples, it should be understood that the techniques can be applied in the context of many other examples.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:

obtaining video that depicts an object across multiple frames of the video;

detecting the object within the obtained video and determining object characteristic data associated with the detected object;

determining user profile data associated with a viewer of the video;

determining scene attribute data associated with the obtained video;

using at least the determined object characteristic data, the determined user profile data, and the determined scene attribute data as a basis to select a replacement object from among a set of multiple candidate replacement objects;

replacing the detected object with the selected replacement object to generate video that is a modified version of the obtained video, wherein replacing the detected object with the selected replacement object to generate video that is a modified version of the obtained video comprises applying a lighting normalization technique to blend the selected replacement object into the video, wherein applying the lighting normalization technique to blend the selected replacement object into the video comprises determining a shape of a shadow of the selected replacement object, determining a shape of a shadow of the detected object, and using the determined shape of the shadow of the selected replacement object and the determined shape of the shadow of the detected object as a basis to modify a shadow of the detected object, wherein the detected object and the selected replacement object differ in at least one object characteristic other than scale, and wherein the shadow of the detected object and the shadow of the selected replacement object differ in at least one characteristic other than scale; and outputting for presentation the generated video.

2. The method of claim 1, wherein the object characteristic data indicates a size, shape, or orientation of the detected object.

3. The method of claim 1, wherein detecting the object within the obtained video and determining the object characteristic data associated with the detected object comprises detecting edges and/or boundaries of the object.

4. The method of claim 1, wherein using at least the determined object characteristic data, the determined user profile data, and the determined scene attribute data as a basis to select a replacement object from among a set of multiple candidate replacement objects comprises using mapping data to map the determined object characteristic data, the determined user profile data, and the determined scene attribute data to a corresponding replacement object.

5. The method of claim 1, wherein replacing the detected object with the selected replacement object to generate video that is a modified version of the obtained video further comprises:

obtaining a three-dimensional model of the selected replacement object;

using the obtained three-dimensional model of the selected replacement object and the determined object characteristic data, together with a time-based affine transform model, to generate a time-based two-dimensional projection of the selected replacement object;

determining object position data associated with the detected object; and at a position indicated by the determined object position data, replacing the detected object with the corresponding time-based two-dimensional projection of the selected replacement object.

6. The method of claim 1, wherein outputting for presentation, the generated video comprises transmitting to a presentation device, video data representing the generated video for display by the presentation device.

7. A computing system configured for performing a set of acts comprising:

obtaining video that depicts an object across multiple frames of the video;

detecting the object within the obtained video and determining object characteristic data associated with the detected object;

determining user profile data associated with a viewer of the video;

determining scene attribute data associated with the obtained video;

using at least the determined object characteristic data, the determined user profile data, and the determined scene attribute data as a basis to select a replacement object from among a set of multiple candidate replacement objects;

replacing the detected object with the selected replacement object to generate video that is a modified version of the obtained video, wherein replacing the detected object with the selected replacement object to generate video that is a modified version of the obtained video comprises applying a lighting normalization technique to blend the selected replacement object into the video, wherein applying the lighting normalization technique to blend the selected replacement object into the video comprises determining a shape of a shadow of the selected replacement object, determining a shape of a shadow of the detected object, and using the determined shape of the shadow of the selected replacement object and the determined shape of the shadow of the detected object as a basis to modify a shadow of the detected object, wherein the detected object and the selected replacement object differ in at least one object characteristic other than scale, and wherein the shadow of the detected object and the shadow of the selected replacement object differ in at least one characteristic other than scale; and outputting for presentation the generated video.

8. The computing system of claim 7, wherein the object characteristic data indicates a size, shape, or orientation of the detected object.

9. The computing system of claim 7, wherein detecting the object within the obtained video and determining the object characteristic data associated with the detected object comprises:

providing video data representing the obtained video to a trained model, wherein the trained model is configured to use at least video data as runtime input-data to generate object characteristic data as runtime output-data, wherein the model was trained using (i) at least one training input-data set including video data representing video depicting a training object, and (ii) at least one corresponding training output-data set including object characteristic data of the training object; and responsive to providing the video data to the trained model, receiving from the trained model, corresponding generated object characteristic data.

10. The computing system of claim 7, wherein using at least the determined object characteristic data, the determined user profile data, and the determined scene attribute data as a basis to select a replacement object from among a set of multiple candidate replacement objects comprises using mapping data to map the determined object characteristic data and the determined user profile data, and the determined scene attribute data to a corresponding replacement object.

11. The computing system of claim 7, wherein replacing the detected object with the selected replacement object to generate video that is a modified version of the obtained video further comprises:

obtaining a three-dimensional model of the selected replacement object;

using the obtained three-dimensional model of the selected replacement object and the determined object characteristic data, together with a time-based affine transform model, to generate a time-based two-dimensional projection of the selected replacement object;

determining object position data associated with the detected object; and at a position indicated by the determined object position data, replacing the detected object with the corresponding time-based two-dimensional projection of the selected replacement object.

12. The computing system of claim 7, wherein outputting for presentation, the generated video comprises transmitting to a presentation device, video data representing the generated video for display by the presentation device.

13. The computing system of claim 12, wherein the presentation device is a television.

14. The computing system of claim 7, wherein outputting for presentation, the generated video comprises displaying the generated video.

15. A non-transitory computer-readable medium having stored thereon program instructions that upon execution by a computing system, cause performance of a set of acts comprising:

obtaining video that depicts an object across multiple frames of the video;

detecting the object within the obtained video and determining object characteristic data associated with the detected object;

determining user profile data associated with a viewer of the video;

determining scene attribute data associated with the obtained video;

using at least the determined object characteristic data, the determined user profile data, and the determined scene attribute data as a basis to select a replacement object from among a set of multiple candidate replacement objects;

replacing the detected object with the selected replacement object to generate video that is a modified version of the obtained video, wherein replacing the detected object with the selected replacement object to generate video that is a modified version of the obtained video comprises applying a lighting normalization technique to blend the selected replacement object into the video, wherein applying the lighting normalization technique to blend the selected replacement object into the video comprises determining a shape of a shadow of the selected replacement object, determining a shape of a shadow of the detected object, and using the determined shape of the shadow of the selected replacement object and the determined shape of the shadow of the detected object as a basis to modify a shadow of the detected object, wherein the detected object and the selected replacement object differ in at least one object characteristic other than scale, and wherein the shadow of the detected object and the shadow of the selected replacement object differ in at least one characteristic other than scale; and outputting for presentation the generated video.

16. The method of claim 1, wherein the scene attribute data specifies information about one or more people in the obtained video.

17. The method of claim 1, wherein the scene attribute data comprises scene scale data.

18. The method of claim 17, further comprising determining the scene scale, wherein determining the scene scale data comprises:

using a trained model to obtain scene scale data for the scene, wherein the trained model was trained with data video data and corresponding metadata specifying information about areas and/or objects in the scene as an input data set.

19. The method of claim 1, wherein determining object characteristic data associated with the detected object comprises:

detecting a brand and/or model of the detected object; and using the detected brand and/or model of the detected object to look up size and/or scale data for the detected object.

20. The method of claim 1, wherein determining object characteristic data associated with the detected object comprises:

detecting a brand and/or or model of the detected object;

using the detected brand and/or model of the detected object to look up multiple candidate size and/or scale data sets for the detected object; and based on an analysis of multiple objects within the obtained video, selecting a single size and/or scale data set from among the multiple candidate size and/or scale data sets.

* * * * *